US010574776B2

(12) United States Patent
Berenger

(10) Patent No.: US 10,574,776 B2
(45) Date of Patent: Feb. 25, 2020

(54) SYSTEMS AND METHODS FOR ADJUSTING IMAGE TRANSMISSION BASED ON DEVICE PROPERTIES

(71) Applicant: Facebook, Inc., Menlo Park, CA (US)

(72) Inventor: Georges Edouard Maurice Berenger, Menlo Park, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

(21) Appl. No.: 15/089,353

(22) Filed: Apr. 1, 2016

(65) Prior Publication Data

US 2017/0085932 A1 Mar. 23, 2017

Related U.S. Application Data

(60) Provisional application No. 62/222,703, filed on Sep. 23, 2015.

(51) Int. Cl.
*H04N 21/2662* (2011.01)
*H04N 21/239* (2011.01)
(Continued)

(52) U.S. Cl.
CPC .......... *H04L 67/2842* (2013.01); *G06F 16/50* (2019.01); *G06F 16/5866* (2019.01); *G06F 16/957* (2019.01); *H04L 67/06* (2013.01); *H04L 67/1097* (2013.01); *H04L 67/18* (2013.01); *H04L 67/322* (2013.01); *H04M 1/72561* (2013.01); *H04N 1/00132* (2013.01); (Continued)

(58) Field of Classification Search
CPC .. H04N 1/387; H04N 5/23293; H04N 7/0122; H04N 21/234372; H04N 21/23439; H04N 21/44029; H04N 13/0022; H04N 5/77; H04N 5/783; H04N 7/013; H04N 21/4318; H04N 2201/325; H04N 2201/3252; H04N 19/59; H04N 19/70; H04N 1/00132; H04N 21/2662; H04N 21/2393; H04N 21/23106; H04N 21/25833; G11B 27/005; H04B 1/3888; H04B 1/3833; G06F 1/1677; G06F 1/1652; G06F 16/957; G06F 16/50; G06F 16/5866; H04L 67/322; H04L 67/2842; H04L 67/1097; H04L 67/06; H04L 67/18; H04M 1/72561

See application file for complete search history.

(56) References Cited

U.S. PATENT DOCUMENTS 8,787,934 B2 * 7/2014 Wang ................ G06F 17/30265
455/456.1
2006/0008161 A1 * 1/2006 Kaithakapuzha ...... H04N 19/91
382/233

(Continued)

*Primary Examiner* — Pankaj Kumar
*Assistant Examiner* — Alazar Tilahun
(74) *Attorney, Agent, or Firm* — Sheppard Mullin Richter & Hampton LLP

(57) ABSTRACT

Systems, methods, and non-transitory computer-readable media can store a set of image portions that forms an image at a specified resolution. A request for the image can be acquired from a client device. The request can include information about one or more properties associated with the client device. A subset of image portions can be selected out of the set of image portions based on the one or more properties associated with the client device. The subset of image portions can be transmitted to the client device in response to the request.

20 Claims, 8 Drawing Sheets

(51) Int. Cl.
*H04N 21/231* (2011.01)
*H04L 29/08* (2006.01)
*H04M 1/725* (2006.01)
*H04N 1/00* (2006.01)
*G06F 16/957* (2019.01)
*G06F 16/50* (2019.01)
*G06F 16/58* (2019.01)

(52) U.S. Cl.
CPC ... *H04N 21/2393* (2013.01); *H04N 21/23106* (2013.01); *H04N 21/2662* (2013.01)

(56) References Cited

U.S. PATENT DOCUMENTS

| | | | |
|---|---|---|---|
| 2013/0024501 A1 | 1/2013 | Tahan | |
| 2013/0312042 A1* | 11/2013 | Shaw | H04N 21/23439 725/62 |
| 2015/0244833 A1* | 8/2015 | Grue | G06F 16/5866 709/219 |
| 2015/0341591 A1* | 11/2015 | Kelder | H04N 7/013 386/285 |
| 2016/0112703 A1* | 4/2016 | Hafey | H04N 19/33 382/232 |
| 2017/0257628 A1 | 9/2017 | Hafey | |

* cited by examiner

600

Determine, based on the one or more properties, a client resolution or a client dimension of a display element of the client device
602

Determine a quantity of image portions forming a version of the image that is capable of being rendered to match the client resolution or the client dimension
604

Include the quantity of image portions in the subset of image portions
606

FIGURE 6

SYSTEMS AND METHODS FOR ADJUSTING IMAGE TRANSMISSION BASED ON DEVICE PROPERTIES

CROSS-REFERENCE TO RELATED APPLICATIONS

This application claims priority to U.S. Provisional Patent Application No. 62/222,703, filed on Sep. 23, 2015 and entitled "SYSTEMS AND METHODS FOR ADJUSTING PROGRESSIVE IMAGE TRANSMISSION BASED ON DEVICE PROPERTIES", which is incorporated herein by reference.

FIELD OF THE INVENTION

The present technology relates to the field of media processing. More particularly, the present technology relates to techniques for adjusting image transmission based on device properties.

BACKGROUND

Today, people often utilize computing devices (or systems) for a wide variety of purposes. Users can use their computing devices to, for example, interact with one another, access content, share content, and create content. In some cases, users can utilize their computing devices to download, view, or otherwise access media content. For instance, users of a social networking system (or service) can, via their computing devices, access their feeds or other users' profiles to view various posts that include media content items, such as images. Under conventional approaches rooted in computer technology, transmitting an entire image at its full resolution can, in some cases, require a significant amount of data. In many instances, users' computing devices (or systems) may have limited data access, such as due to limited cellular data plans. Moreover, in some instances, users' computing devices may not necessarily have the capabilities (e.g., due to limited display screen sizes or resolutions) to efficiently utilize entire images at full resolutions. Furthermore, conventional approaches to providing images can store multiple versions of an image to serve different computing devices, which can cause data storage inefficiency. As such, conventional approaches can create challenges for or reduce the overall experience associated with utilizing media content such as images.

SUMMARY

Various embodiments of the present disclosure can include systems, methods, and non-transitory computer readable media configured to store a set of image portions that forms an image at a specified resolution. A request for the image can be acquired from a client device. The request can include information about one or more properties associated with the client device. A subset of image portions can be selected out of the set of image portions based on the one or more properties associated with the client device. The subset of image portions can be transmitted to the client device in response to the request.

In an embodiment, selecting the subset of image portions out of the set of image portions based on the one or more properties associated with the client device can further comprise determining, based on the one or more properties, at least one of a client resolution or a client dimension of a display element of the client device. A quantity of image portions forming a version of the image that is capable of being rendered to match, within an allowable deviation, the at least one of the client resolution or the client dimension of the display element can be determined. The quantity of image portions can be included in the subset of image portions.

In an embodiment, the version of the image can maintain at least a specified threshold level of visually perceived detail. The specified threshold level of visually perceived detail can be based on at least some of the one or more properties associated with the client device.

In an embodiment, the version of the image can be caused to be displayed via the client device at the client resolution.

In an embodiment, the one or more properties associated with the client device can indicate a location at which the client device is used. The subset of image portions can be selected out of the set of image portions based on the location.

In an embodiment, at least a first quantity of image portions can be selected to be included in the subset of image portions when the location corresponds to a first region recognized as having at least a specified threshold level of device capability or network capability. A second quantity of image portions less than the first quantity can be selected to be included in the subset of image portions when the location corresponds to a second region recognized as having less than the specified threshold level of device capability or network capability.

In an embodiment, the set of image portions that forms the image at the specified resolution can be stored via a cache associated with a content delivery network.

In an embodiment, the cache can exclude one or more different versions of the image at one or more different resolutions other than the specified resolution.

In an embodiment, the set of image portions can include a set of one or more image data parts.

In an embodiment, the image can include a Joint Photographic Experts Group (JPEG) image. The set of the one or more image data parts can include a set of one or more progressive JPEG scans.

It should be appreciated that many other features, applications, embodiments, and/or variations of the disclosed technology will be apparent from the accompanying drawings and from the following detailed description. Additional and/or alternative implementations of the structures, systems, non-transitory computer readable media, and methods described herein can be employed without departing from the principles of the disclosed technology.

BRIEF DESCRIPTION OF THE DRAWINGS

FIG. 6 illustrates an example method associated with adjusting image transmission based on device properties, according to an embodiment of the present disclosure.

Figure 1:
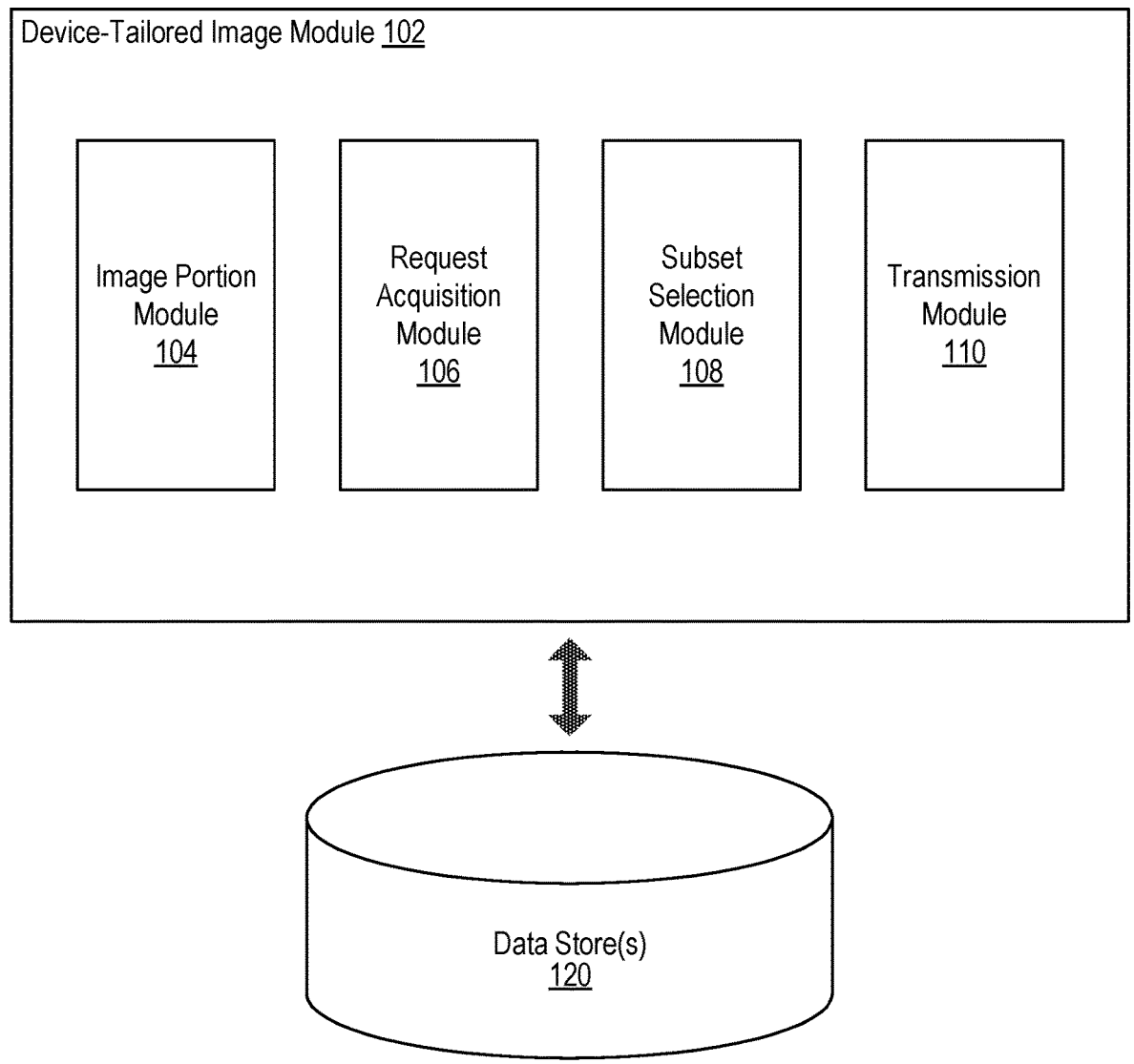
FIG. 1 illustrates an example system including an example device-tailored image module configured to facilitate adjusting image transmission based on device properties, according to an embodiment of the present disclosure.

The figures depict various embodiments of the disclosed technology for purposes of illustration only, wherein the figures use like reference numerals to identify like elements. One skilled in the art will readily recognize from the following discussion that alternative embodiments of the structures and methods illustrated in the figures can be employed without departing from the principles of the disclosed technology described herein.

DETAILED DESCRIPTION

Adjusting Image Transmission Based on Device Properties

People use computing systems (or devices) for various purposes. Users can utilize their computing systems to establish connections, engage in communications, interact with one another, and/or interact with various types of content. In some cases, a user of a computing device can access media content. For example, the user can utilize his or her computing device to access a social networking system (or service). In this example, the user can download, view, or otherwise interact with a media content item, such as an image, via the user's newsfeed, via pages associated with other entities, and/or via profiles associated with other users of the social networking system.

Conventional approaches rooted in computer technology generally provide, deliver, or transmit an entire image at its full resolution when a user's computing device requests for the image. Transmission of the entire image at its full resolution under conventional approaches can require a significant or non-trivial amount of data, which may be limited based on the user's data plan (e.g., cellular data plan). Moreover, in accordance with conventional approaches, network conditions may sometimes not be suitable to allow for efficient transmission of the entire image at its full resolution. Additionally, such conventional approaches can be inefficient or wasteful when the user's computing device does not require the entire image at its full resolution or when the user's computing device lacks the capability to efficiently utilize the entire image at its full resolution.

Furthermore, in some cases, conventional approaches to providing images can store multiple versions of each image in a cache. For example, a cache of a content delivery network can store at least a low resolution version of an image and a high resolution version of the image, such that the cache can provide, deliver, transmit, or make available whichever version of the image is suitable based on a request for the image. However, such conventional approaches can cause inefficiencies for data storage, since each image can require multiple versions to be stored or cached.

Due to these or other concerns, conventional approaches can be disadvantageous or problematic. Therefore, an improved approach can be beneficial for addressing or alleviating various drawbacks associated with conventional approaches. Based on computer technology, the disclosed technology can adjust or tailor image transmission based on device properties. Various embodiments of the present disclosure can store a set of image portions that forms an image at a specified resolution. A request for the image can be acquired from a client device. The request can include information about one or more properties associated with the client device. A subset of image portions can be selected out of the set of image portions based on the one or more properties associated with the client device. The subset of image portions can be transmitted to the client device in response to the request. It is contemplated that there can be many variations and/or other possibilities associated with the disclosed technology.

FIG. 1 illustrates an example system 100 including an example device-tailored image module 102 configured to facilitate adjusting image transmission based on device properties, according to an embodiment of the present disclosure. As shown in the example of FIG. 1, the device-tailored image module 102 can include an image portion module 104, a request acquisition module 106, a subset selection module 108, and a transmission module 110. In some instances, the example system 100 can include at least one data store 120. The components (e.g., modules, elements, etc.) shown in this figure and all figures herein are exemplary only, and other implementations may include additional, fewer, integrated, or different components. Some components may not be shown so as not to obscure relevant details.

In some embodiments, the device-tailored image module 102 can be implemented, in part or in whole, as software, hardware, or any combination thereof. In general, a module as discussed herein can be associated with software, hardware, or any combination thereof. In some implementations, one or more functions, tasks, and/or operations of modules can be carried out or performed by software routines, software processes, hardware, and/or any combination thereof. In some cases, the device-tailored image module 102 can be implemented, in part or in whole, as software running on one or more computing devices or systems, such as on a user or client computing device. For example, the device-tailored image module 102 or at least a portion thereof can be implemented as or within an application (e.g., app), a program, an applet, or an operating system, etc., running on a user computing device or a client computing system, such as the user device 710 of FIG. 7. In another example, the device-tailored image module 102 or at least a portion thereof can be implemented using one or more computing devices or systems that include one or more servers, such as network servers or cloud servers. In some instances, the device-tailored image module 102 can, in part or in whole, be implemented within or configured to operate in conjunction with a social networking system (or service), such as the social networking system 730 of FIG. 7. It should be understood that there can be many variations or other possibilities.

The image portion module 104 can be configured to perform various operations or tasks associated with handling or processing images formed based on respective sets of image portions. In some embodiments, the image portion module 104 can be configured to facilitate storing a set of image portions that forms an image at a specified resolution. The image portion module 104 can, for instance, work or operate in conjunction with the at least one data store 120 to store or cache the image formed by the set of image portions. In one example, the image can be one of a plurality of images utilized in a social networking system (or service). In this example, the image can be uploaded or provided by a particular user of the social networking system. The image can also be compressed and/or converted to the specified resolution (e.g., a preset 640p by 640p resolution, a preset 1080p by 1080p resolution, etc.) using an image format with various data portions. Then various users, such as users of the social networking system, can view or access the image. In some cases, the set of image portions forming the image can correspond to a set of one or more image data parts (e.g., image scans). For instance, the image can correspond to a Joint Photographic Experts Group (JPEG) image and the set of the one or more image data parts can correspond to a set of one or more progressive JPEG scans. It should be appreciated that all examples herein are provided for illustrative purposes and that many variations are possible.

In some implementations, the request acquisition module 106 can be configured to facilitate acquiring (e.g., receiving, fetching, etc.) a request from a client device for the image. The request can include information about one or more properties associated with the client device. In one example, the image formed by the set of image portions can be provided or made available at the social networking system. In this example, a viewer or audience member can attempt to utilize his or her computing device (i.e., the client device), such as a smartphone, to access a newsfeed, a profile, a page, an album, and/or a communication, etc., at the social networking system. The image can be published or posted via the newsfeed, the profile, the page, the album, and/or the communication, etc. In this example, in order to download and render the image, the computing device of the viewer or audience member accordingly requests the image. In some implementations, the request can include information about one or more properties of the computing device of the viewer or audience member. For example, the one or more properties can indicate the resolution of a display element of the computing device, one or more dimensions (e.g., length, width, diagonal, etc.) of the device (or of the display element of the device), and/or other attributes of the device, etc. Again, it is contemplated that there can be many variations or other possibilities.

Moreover, the subset selection module 108 can be configured to facilitate selecting a subset of image portions out of the set of image portions based on the one or more properties associated with the client device. For example, the subset selection module 108 can select more image portions to be included in the subset when the one or more properties of the client device indicates that the client device is capable of handling a higher quality version of the image. Similarly, for instance, the subset selection module 108 can include fewer image portions in the subset when the one or more properties of the client device indicates that the client device is suitable for a lower quality version of the image. More details regarding the subset selection module 108 will be provided below with reference to FIG. 2.

Additionally, the transmission module 110 can be configured to facilitate transmitting the subset of image portions to the client device in response to the request. In some embodiments, since the subset of image portions is tailored or adjusted for each particular client device based on the respective properties of each client device, the amount of data to be transferred or transmitted by the transmission module 110 can result a significant improvement to payload efficiency or optimization. Subsequent to the subset of image portions being transmitted by the transmission module 110 in response to the request, the disclosed technology can cause the image (or a suitable version of the image) to be displayed at the client device. Again, it should be understood that there can be many variations or other possibilities.

Furthermore, in some embodiments, the device-tailored image module 102 can be configured to communicate and/or operate with the at least one data store 120, as shown in the example system 100. The at least one data store 120 can be configured to store and maintain various types of data. In some implementations, the at least one data store 120 can store information associated with the social networking system (e.g., the social networking system 730 of FIG. 7). The information associated with the social networking system can include data about users, social connections, social interactions, locations, geo-fenced areas, maps, places, events, pages, groups, posts, communications, content, feeds, account settings, privacy settings, a social graph, and various other types of data. In some implementations, the at least one data store 120 can store information associated with users, such as user identifiers, user information, profile information, user locations, user specified settings, content produced or posted by users, and various other types of user data. In some embodiments, the at least one data store 120 can store information that is utilized by the device-tailored image module 102. Again, it is contemplated that there can be many variations or other possibilities.

Figure 2:
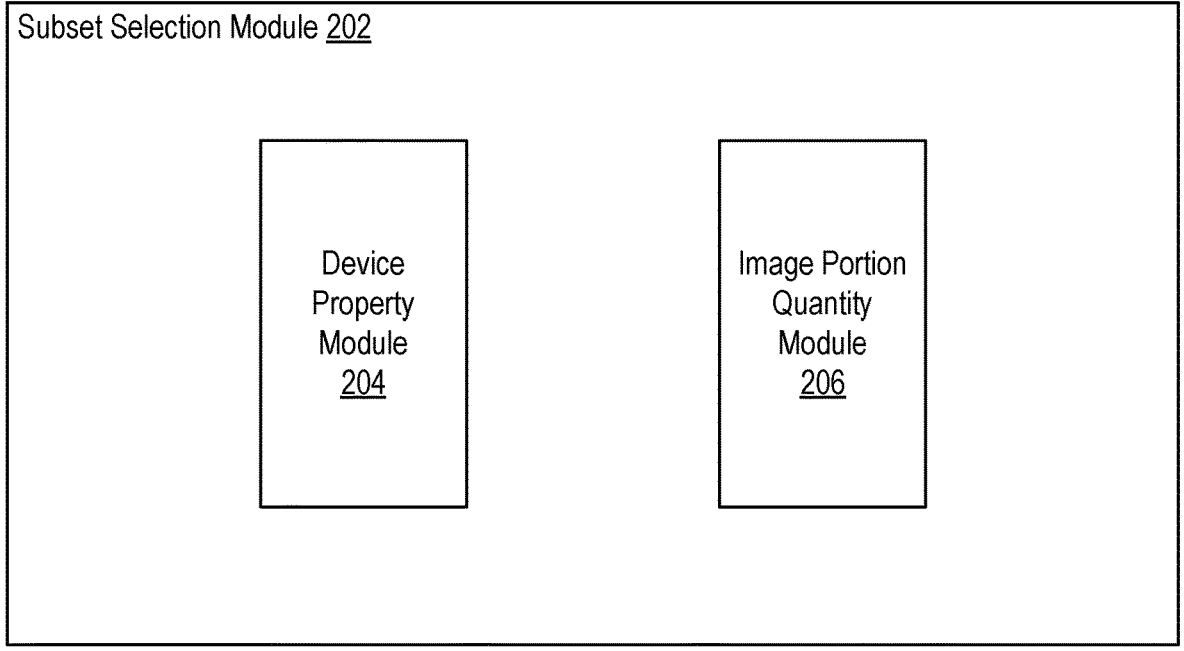
FIG. 2 illustrates an example subset selection module configured to facilitate adjusting image transmission based on device properties, according to an embodiment of the present disclosure.

FIG. 2 illustrates an example subset selection module 202 configured to facilitate adjusting image transmission based on device properties, according to an embodiment of the present disclosure. In some embodiments, the subset selection module 108 of FIG. 1 can be implemented as the example subset selection module 202. As shown in FIG. 2, the subset selection module 202 can include a device property module 204 and an image portion quantity module 206.

As discussed previously, the subset selection module 202 can be configured to facilitate selecting a subset of image portions out of a set of image portions based on one or more properties associated with a client device. In some embodiments, the subset selection module 202 can utilize the device property module 204 to facilitate determining, based on the one or more properties, at least one of a client resolution or a client dimension of a display element (e.g., display screen, monitor, touch display, etc.) of the client device. For instance, the subset selection module 202 can analyze the one or more properties to determine or identify a resolution (e.g., 1136p by 640p, 1920p by 1080p, etc.) or one or more dimensions (e.g., length, width, diagonal, etc.) of the client device.

In some implementations, the subset selection module 202 can utilize the image portion quantity module 206 to facilitate determining a quantity of image portions forming a version of the image that is capable of being rendered (e.g., up-scaled, down-scaled, maintained in scale, etc.) to match, within an allowable deviation, the at least one of the client resolution or the client dimension of the display element. The image portion quantity module 206 can then include the quantity of image portions in the subset of image portions. Moreover, the version of the image can maintain at least a specified threshold level of visually perceived detail. The specified threshold level of visually perceived detail can be based on at least some of the one or more properties associated with the client device. The disclosed technology can further cause the version of the image to be displayed via the client device at the client resolution.

In one example, if the image is at a specified (i.e., preset, predefined, etc.) resolution of 1080p by 1080p and the client device is determined to be a 10-inch tablet with a resolution of 1920p by 1080p, then the image portion quantity module 206 can select the entire set of image portions to be included in the subset (i.e., a non-proper subset). The client device can then render and display the image at 1080p by 1080p with all the details. In another example, using the same image at the specified resolution of 1080p by 1080p but the client device is a 4-inch wide phone with a resolution of 1920p by 1080p, then the image portion quantity module 206 can select only the first X quantity of image portions in the set to be included in the subset of image portions. In this example, each image portion in the X quantity of the subset is still at the specified resolution of 1080p by 1080p, but if the subset is rendered at 1080p by 1080p on the 10-inch tablet, the resulting appearance may have fewer details, or be inferior in image quality when compared to a resulting appearance produced from the entire set. However, the disclosed technology can enable the 4-inch wide client device to show the 1080p by 1080p subset of image portions at a similar perceived quality. In this example, the visually perceived detail of the image can still be maintained (within an allowable deviation) at least at a specified threshold level since the 4-inch phone client device has smaller physical dimensions than the 10-inch tablet and the finer details cannot be perceived by the human eye, but the amount of data transmitted to the client device is reduced since not all of the entire set of image portions has been transmitted to the client device. Again, all examples herein are provided for illustrative purposes and many variations are possible.

Furthermore, in some embodiments, the device property module 204 can determine that the one or more properties associated with the client device indicate a location at which the client device is used. Based on the location, the image portion quantity module 206 can select the subset of image portions out of the set of image portions. In one instance, at least a first quantity of image portions can be selected by the image portion quantity module 206 to be included in the subset of image portions when the location corresponds to a first region recognized as having at least a specified threshold level of device capability or network capability (e.g., a country in which a threshold number of users have computing devices with advanced capabilities beyond a specified minimum level, a state or province with generally reliable or efficient networking technology that satisfies specified criteria, etc.). Moreover, in this instance, a second quantity of image portions less than the first quantity can be selected by the image portion quantity module 206 to be included in the subset of image portions when the location corresponds to a second region recognized as having less than the specified threshold level of device capability or network capability (e.g., a territory in which a certain number users have less developed computing devices that do not meet a specified minimum level, a city with generally poor networking technology that does not satisfy specified criteria, etc.). As discussed above, it is contemplated that many variations are possible.

Figure 3:
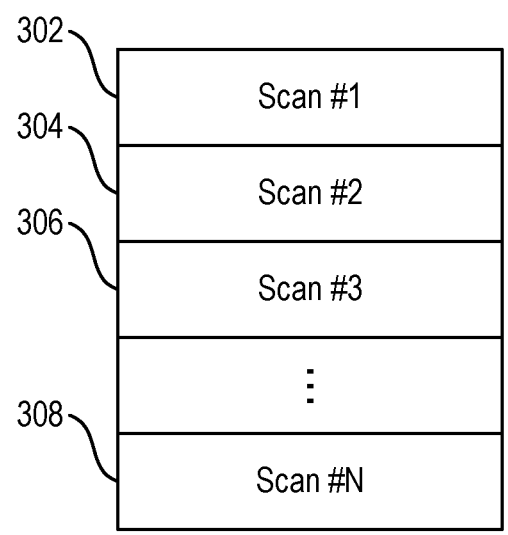
FIG. 3 illustrates an example diagram representing an image associated with adjusting image transmission based on device properties, according to an embodiment of the present disclosure.

FIG. 3 illustrates an example diagram 300 representing an image associated with adjusting image transmission based on device properties, according to an embodiment of the present disclosure. In the example diagram 300 of FIG. 3, there can be a representation of an image which is formed by a set of image portions, such as Scan #1 302, Scan #2 304, Scan #3 306, through Scan #N 308, and so forth.

In the example of FIG. 3, the set of image portions can include a set of one or more image data parts. For instance, the image can include a Joint Photographic Experts Group (JPEG) image and the set of the one or more image data parts can include a set of one or more progressive JPEG scans. In one example, if the image is at a specified resolution of 1080p by 1080p, then the entire set of image portions can collectively form the image (in full/original detail) at the specified resolution. In this example, each image portion in the set can correspond to an image data part and can also be at the specified resolution. The first image data part (e.g., Scan #1 302) can provide general details of the image. If rendered and displayed, the first image data part (e.g., Scan #1 302) can appear as a significantly pixelated or blurry 1080p by 1080p version of the image. Each image data part (i.e., each image portion) can provide more detail and appear as a less blurry/pixelated version of the image, while also being at the specified resolution. Again, many variations are possible.

Figure 4:
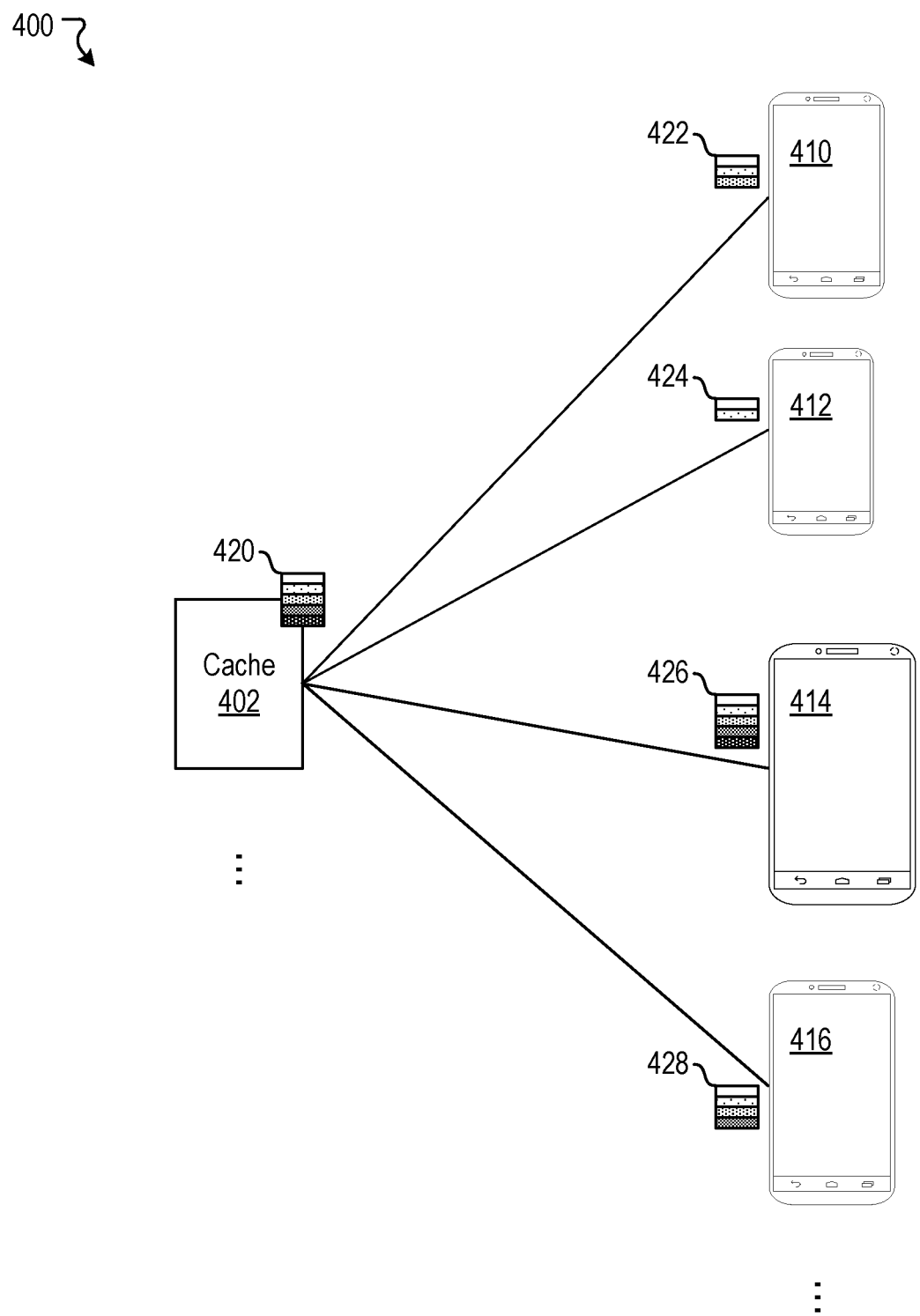
FIG. 4 illustrates an example scenario associated with adjusting image transmission based on device properties, according to an embodiment of the present disclosure.

FIG. 4 illustrates an example scenario 400 associated with adjusting image transmission based on device properties, according to an embodiment of the present disclosure. As shown in the example scenario 400 of FIG. 4, there can be a cache 402 and a plurality of computing devices (or systems), such as devices 410, 412, 414, and 416. In some cases, the cache 402 can be associated with a content delivery network, such as a content delivery network for a social networking system.

As discussed previously, an image at a specified resolution can be formed by, can be represented by, or can include a set of image portions (e.g., image data parts). In the example scenario 400, the cache 402 can store a particular image 420 formed by a particular set of image portions. In addition to improving data transmission or transfer efficiency/optimization, the disclosed technology can also improve storage or caching efficiency/optimization. In some cases, the disclosed technology can enable the cache 402 to exclude one or more different versions of the image at one or more different resolutions other than the specified resolution. As such, for the particular image 420, only a single version of the particular image 420 is stored at the cache 420. In one instance, the single version of the particular image 420 can be stored or cached at its full or original resolution. In another instance, the single version of the particular image 420 can be compressed and/or converted to the specified resolution.

In some embodiments, the disclosed technology can acquire one or more properties about each of the plurality of computing devices 410, 412, 414, and 416. In the example scenario 400, the disclosed technology can determine, based on the properties of the first computing device 410, that the first computing device 410 is suitable for or capable of handling a subset 422 of three image portions. The disclosed technology can also determine, based on the properties of the second computing device 412, that the second computing device 412 is suitable for or capable of handling a subset 424 of two image portions. Moreover, the disclosed technology can determine, based on the properties of the third computing device 414, that the third computing device 414 is suitable for or capable of handling the entire set of image portions (e.g., a non-proper subset 426 of five image portions). Further, the disclosed technology can determine, based on the properties of the fourth computing device 416, that the fourth computing device 416 is suitable for or capable of handling a subset 428 of four image portions. As discussed, it should be appreciated that all examples herein are provided for illustrative purposes and that there can be many variations or other possibilities.

Figure 5:
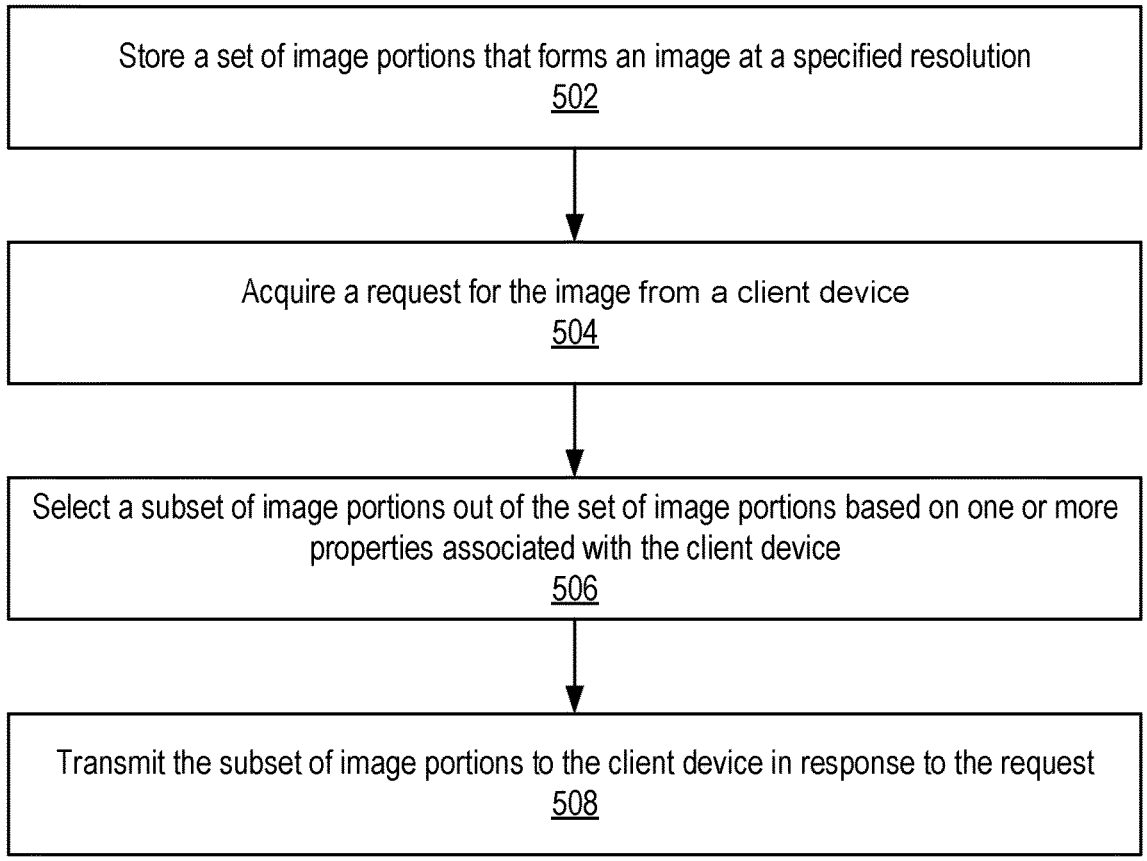
FIG. 5 illustrates an example method associated with adjusting image transmission based on device properties, according to an embodiment of the present disclosure.

FIG. 5 illustrates an example method 500 associated with adjusting image transmission based on device properties, according to an embodiment of the present disclosure. It should be appreciated that there can be additional, fewer, or alternative steps performed in similar or alternative orders, or in parallel, within the scope of the various embodiments unless otherwise stated.

At block 502, the example method 500 can store a set of image portions that forms an image at a specified resolution. At block 504, the example method 500 can acquire from a client device a request for the image. The request can include information about one or more properties associated with the client device. At block 506, the example method 500 can select a subset of image portions out of the set of image portions based on the one or more properties associated with the client device. At block 508, the example method 500 can transmit the subset of image portions to the client device in response to the request.

FIG. 6 illustrates an example method 600 associated with adjusting image transmission based on device properties, according to an embodiment of the present disclosure. As discussed, it should be understood that there can be additional, fewer, or alternative steps performed in similar or alternative orders, or in parallel, within the scope of the various embodiments unless otherwise stated.

At block 602, the example method 600 can determine, based on the one or more properties, at least one of a client resolution or a client dimension of a display element of the client device. At block 604, the example method 600 can determine a quantity of image portions forming a version of the image that is capable of being rendered to match, within an allowable deviation, the at least one of the client resolution or the client dimension of the display element. At block 606, the example method 600 can include the quantity of image portions in the subset of image portions.

It is contemplated that there can be many other uses, applications, features, possibilities, and/or variations associated with the various embodiments of the present disclosure. For example, in some implementations, device properties can include information about device connectivity to a network (e.g., WiFi, cellular network, etc.). As such, the subset of image portions can be selected based on the information about device connectivity. In another example, in some cases, users can choose whether or not to opt-in to utilize the disclosed technology. The disclosed technology can, for instance, also ensure that various privacy settings and preferences are maintained and can prevent private information from being divulged. In a further example, various embodiments of the present disclosure can learn, improve, and/or be refined over time.

Social Networking System—Example Implementation

Figure 7:
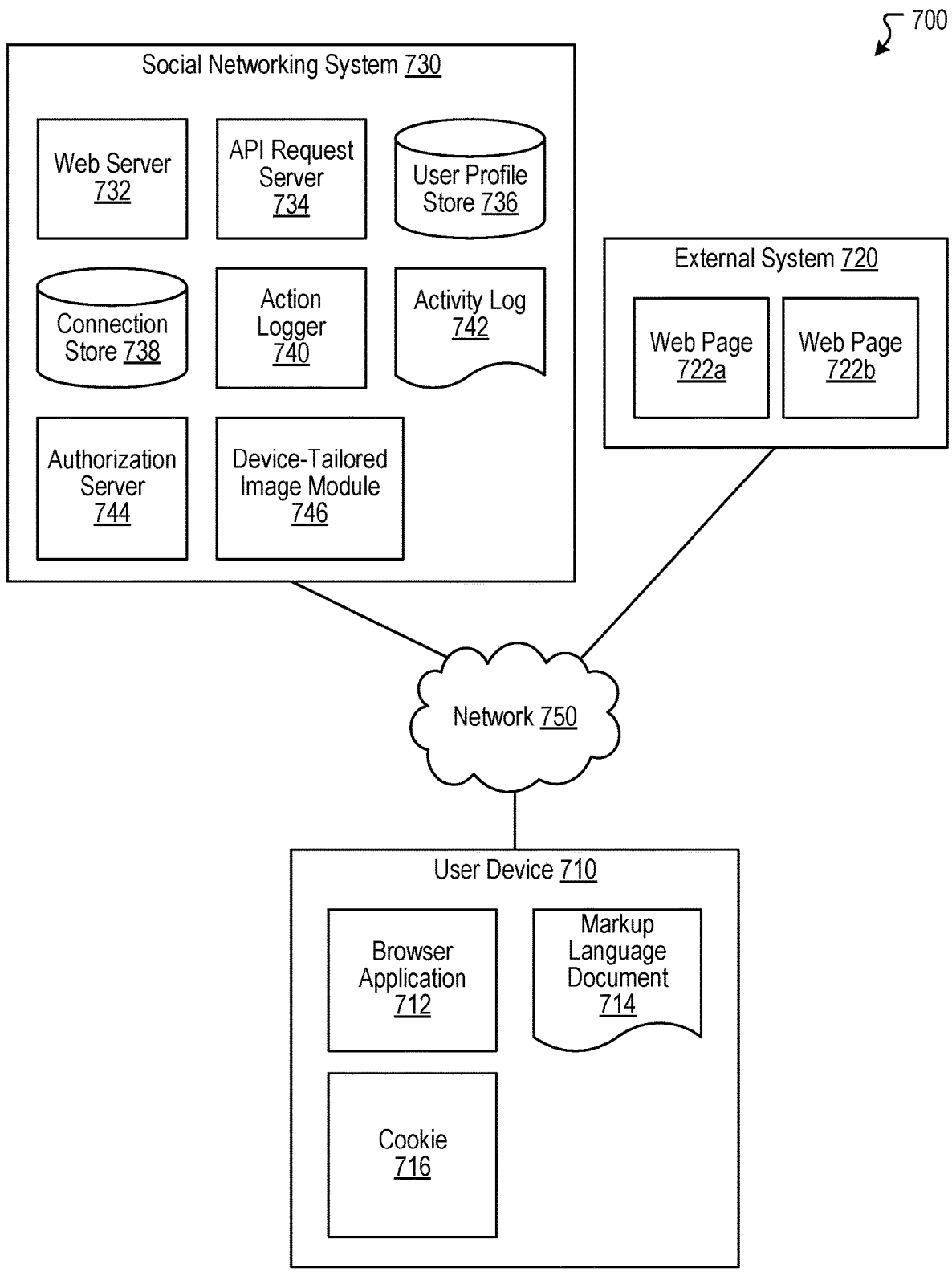
FIG. 7 illustrates a network diagram of an example system including an example social networking system that can be utilized in various scenarios, according to an embodiment of the present disclosure.

FIG. 7 illustrates a network diagram of an example system 700 that can be utilized in various scenarios, in accordance with an embodiment of the present disclosure. The system 700 includes one or more user devices 710, one or more external systems 720, a social networking system (or service) 730, and a network 750.

In an embodiment, the social networking service, provider, and/or system discussed in connection with the embodiments described above may be implemented as the social networking system 730. For purposes of illustration, the embodiment of the system 700, shown by FIG. 7, includes a single external system 720 and a single user device 710. However, in other embodiments, the system 700 may include more user devices 710 and/or more external systems 720. In certain embodiments, the social networking system 730 is operated by a social network provider, whereas the external systems 720 are separate from the social networking system 730 in that they may be operated by different entities. In various embodiments, however, the social networking system 730 and the external systems 720 operate in conjunction to provide social networking services to users (or members) of the social networking system 730. In this sense, the social networking system 730 provides a platform or backbone, which other systems, such as external systems 720, may use to provide social networking services and functionalities to users across the Internet. In some embodiments, the social networking system 730 can include or correspond to a social media system (or service).

The user device 710 comprises one or more computing devices (or systems) that can receive input from a user and transmit and receive data via the network 750. In one embodiment, the user device 710 is a conventional computer system executing, for example, a Microsoft Windows compatible operating system (OS), Apple OS X, and/or a Linux distribution. In another embodiment, the user device 710 can be a computing device or a device having computer functionality, such as a smart-phone, a tablet, a personal digital assistant (PDA), a mobile telephone, a laptop computer, a wearable device (e.g., a pair of glasses, a watch, a bracelet, etc.), a camera, an appliance, etc. The user device 710 is configured to communicate via the network 750. The user device 710 can execute an application, for example, a browser application that allows a user of the user device 710 to interact with the social networking system 730. In another embodiment, the user device 710 interacts with the social networking system 730 through an application programming interface (API) provided by the native operating system of the user device 710, such as iOS and ANDROID. The user device 710 is configured to communicate with the external system 720 and the social networking system 730 via the network 750, which may comprise any combination of local area and/or wide area networks, using wired and/or wireless communication systems.

In one embodiment, the network 750 uses standard communications technologies and protocols. Thus, the network 750 can include links using technologies such as Ethernet, 802.11, worldwide interoperability for microwave access (WiMAX), 3G, 4G, CDMA, GSM, LTE, digital subscriber line (DSL), etc. Similarly, the networking protocols used on the network 750 can include multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and the like. The data exchanged over the network 750 can be represented using technologies and/or formats including hypertext markup language (HTML) and extensible markup language (XML). In addition, all or some links can be encrypted using conventional encryption technologies such as secure sockets layer (SSL), transport layer security (TLS), and Internet Protocol security (IPsec).

In one embodiment, the user device 710 may display content from the external system 720 and/or from the social networking system 730 by processing a markup language document 714 received from the external system 720 and from the social networking system 730 using a browser application 712. The markup language document 714 identifies content and one or more instructions describing formatting or presentation of the content. By executing the instructions included in the markup language document 714, the browser application 712 displays the identified content using the format or presentation described by the markup language document 714. For example, the markup language document 714 includes instructions for generating and displaying a web page having multiple frames that include text and/or image data retrieved from the external system 720 and the social networking system 730. In various embodiments, the markup language document 714 comprises a data file including extensible markup language (XML) data, extensible hypertext markup language (XHTML) data, or other markup language data. Additionally, the markup language document 714 may include JavaScript Object Notation (JSON) data, JSON with padding (JSONP), and JavaScript data to facilitate data-interchange between the external system 720 and the user device 710. The browser application 712 on the user device 710 may use a JavaScript compiler to decode the markup language document 714.

The markup language document 714 may also include, or link to, applications or application frameworks such as FLASH™ or Unity™ applications, the Silverlight™ application framework, etc.

In one embodiment, the user device 710 also includes one or more cookies 716 including data indicating whether a user of the user device 710 is logged into the social networking system 730, which may enable modification of the data communicated from the social networking system 730 to the user device 710.

The external system 720 includes one or more web servers that include one or more web pages 722a, 722b, which are communicated to the user device 710 using the network 750. The external system 720 is separate from the social networking system 730. For example, the external system 720 is associated with a first domain, while the social networking system 730 is associated with a separate social networking domain. Web pages 722a, 722b, included in the external system 720, comprise markup language documents 714 identifying content and including instructions specifying formatting or presentation of the identified content.

The social networking system 730 includes one or more computing devices for a social network, including a plurality of users, and providing users of the social network with the ability to communicate and interact with other users of the social network. In some instances, the social network can be represented by a graph, i.e., a data structure including edges and nodes. Other data structures can also be used to represent the social network, including but not limited to databases, objects, classes, meta elements, files, or any other data structure. The social networking system 730 may be administered, managed, or controlled by an operator. The operator of the social networking system 730 may be a human being, an automated application, or a series of applications for managing content, regulating policies, and collecting usage metrics within the social networking system 730. Any type of operator may be used.

Users may join the social networking system 730 and then add connections to any number of other users of the social networking system 730 to whom they desire to be connected. As used herein, the term "friend" refers to any other user of the social networking system 730 to whom a user has formed a connection, association, or relationship via the social networking system 730. For example, in an embodiment, if users in the social networking system 730 are represented as nodes in the social graph, the term "friend" can refer to an edge formed between and directly connecting two user nodes.

Connections may be added explicitly by a user or may be automatically created by the social networking system 730 based on common characteristics of the users (e.g., users who are alumni of the same educational institution). For example, a first user specifically selects a particular other user to be a friend. Connections in the social networking system 730 are usually in both directions, but need not be, so the terms "user" and "friend" depend on the frame of reference. Connections between users of the social networking system 730 are usually bilateral ("two-way"), or "mutual," but connections may also be unilateral, or "one-way." For example, if Bob and Joe are both users of the social networking system 730 and connected to each other, Bob and Joe are each other's connections. If, on the other hand, Bob wishes to connect to Joe to view data communicated to the social networking system 730 by Joe, but Joe does not wish to form a mutual connection, a unilateral connection may be established. The connection between users may be a direct connection; however, some embodiments of the social networking system 730 allow the connection to be indirect via one or more levels of connections or degrees of separation.

In addition to establishing and maintaining connections between users and allowing interactions between users, the social networking system 730 provides users with the ability to take actions on various types of items supported by the social networking system 730. These items may include groups or networks (i.e., social networks of people, entities, and concepts) to which users of the social networking system 730 may belong, events or calendar entries in which a user might be interested, computer-based applications that a user may use via the social networking system 730, transactions that allow users to buy or sell items via services provided by or through the social networking system 730, and interactions with advertisements that a user may perform on or off the social networking system 730. These are just a few examples of the items upon which a user may act on the social networking system 730, and many others are possible. A user may interact with anything that is capable of being represented in the social networking system 730 or in the external system 720, separate from the social networking system 730, or coupled to the social networking system 730 via the network 750.

The social networking system 730 is also capable of linking a variety of entities. For example, the social networking system 730 enables users to interact with each other as well as external systems 720 or other entities through an API, a web service, or other communication channels. The social networking system 730 generates and maintains the "social graph" comprising a plurality of nodes interconnected by a plurality of edges. Each node in the social graph may represent an entity that can act on another node and/or that can be acted on by another node. The social graph may include various types of nodes. Examples of types of nodes include users, non-person entities, content items, web pages, groups, activities, messages, concepts, and any other things that can be represented by an object in the social networking system 730. An edge between two nodes in the social graph may represent a particular kind of connection, or association, between the two nodes, which may result from node relationships or from an action that was performed by one of the nodes on the other node. In some cases, the edges between nodes can be weighted. The weight of an edge can represent an attribute associated with the edge, such as a strength of the connection or association between nodes. Different types of edges can be provided with different weights. For example, an edge created when one user "likes" another user may be given one weight, while an edge created when a user befriends another user may be given a different weight.

As an example, when a first user identifies a second user as a friend, an edge in the social graph is generated connecting a node representing the first user and a second node representing the second user. As various nodes relate or interact with each other, the social networking system 730 modifies edges connecting the various nodes to reflect the relationships and interactions.

The social networking system 730 also includes user-generated content, which enhances a user's interactions with the social networking system 730. User-generated content may include anything a user can add, upload, send, or "post" to the social networking system 730. For example, a user communicates posts to the social networking system 730 from a user device 710. Posts may include data such as status updates or other textual data, location information, images such as photos, videos, links, music or other similar data and/or media. Content may also be added to the social networking system 730 by a third party. Content "items" are represented as objects in the social networking system 730. In this way, users of the social networking system 730 are encouraged to communicate with each other by posting text and content items of various types of media through various communication channels. Such communication increases the interaction of users with each other and increases the frequency with which users interact with the social networking system 730.

The social networking system 730 includes a web server 732, an API request server 734, a user profile store 736, a connection store 738, an action logger 740, an activity log 742, and an authorization server 744. In an embodiment of the invention, the social networking system 730 may include additional, fewer, or different components for various applications. Other components, such as network interfaces, security mechanisms, load balancers, failover servers, management and network operations consoles, and the like are not shown so as to not obscure the details of the system.

The user profile store 736 maintains information about user accounts, including biographic, demographic, and other types of descriptive information, such as work experience, educational history, hobbies or preferences, location, and the like that has been declared by users or inferred by the social networking system 730. This information is stored in the user profile store 736 such that each user is uniquely identified. The social networking system 730 also stores data describing one or more connections between different users in the connection store 738. The connection information may indicate users who have similar or common work experience, group memberships, hobbies, or educational history. Additionally, the social networking system 730 includes user-defined connections between different users, allowing users to specify their relationships with other users. For example, user-defined connections allow users to generate relationships with other users that parallel the users' real-life relationships, such as friends, co-workers, partners, and so forth. Users may select from predefined types of connections, or define their own connection types as needed. Connections with other nodes in the social networking system 730, such as non-person entities, buckets, cluster centers, images, interests, pages, external systems, concepts, and the like are also stored in the connection store 738.

The social networking system 730 maintains data about objects with which a user may interact. To maintain this data, the user profile store 736 and the connection store 738 store instances of the corresponding type of objects maintained by the social networking system 730. Each object type has information fields that are suitable for storing information appropriate to the type of object. For example, the user profile store 736 contains data structures with fields suitable for describing a user's account and information related to a user's account. When a new object of a particular type is created, the social networking system 730 initializes a new data structure of the corresponding type, assigns a unique object identifier to it, and begins to add data to the object as needed. This might occur, for example, when a user becomes a user of the social networking system 730, the social networking system 730 generates a new instance of a user profile in the user profile store 736, assigns a unique identifier to the user account, and begins to populate the fields of the user account with information provided by the user.

The connection store 738 includes data structures suitable for describing a user's connections to other users, connections to external systems 720 or connections to other entities. The connection store 738 may also associate a connection type with a user's connections, which may be used in conjunction with the user's privacy setting to regulate access to information about the user. In an embodiment of the invention, the user profile store 736 and the connection store 738 may be implemented as a federated database.

Data stored in the connection store 738, the user profile store 736, and the activity log 742 enables the social networking system 730 to generate the social graph that uses nodes to identify various objects and edges connecting nodes to identify relationships between different objects. For example, if a first user establishes a connection with a second user in the social networking system 730, user accounts of the first user and the second user from the user profile store 736 may act as nodes in the social graph. The connection between the first user and the second user stored by the connection store 738 is an edge between the nodes associated with the first user and the second user. Continuing this example, the second user may then send the first user a message within the social networking system 730. The action of sending the message, which may be stored, is another edge between the two nodes in the social graph representing the first user and the second user. Additionally, the message itself may be identified and included in the social graph as another node connected to the nodes representing the first user and the second user.

In another example, a first user may tag a second user in an image that is maintained by the social networking system 730 (or, alternatively, in an image maintained by another system outside of the social networking system 730). The image may itself be represented as a node in the social networking system 730. This tagging action may create edges between the first user and the second user as well as create an edge between each of the users and the image, which is also a node in the social graph. In yet another example, if a user confirms attending an event, the user and the event are nodes obtained from the user profile store 736, where the attendance of the event is an edge between the nodes that may be retrieved from the activity log 742. By generating and maintaining the social graph, the social networking system 730 includes data describing many different types of objects and the interactions and connections among those objects, providing a rich source of socially relevant information.

The web server 732 links the social networking system 730 to one or more user devices 710 and/or one or more external systems 720 via the network 750. The web server 732 serves web pages, as well as other web-related content, such as Java, JavaScript, Flash, XML, and so forth. The web server 732 may include a mail server or other messaging functionality for receiving and routing messages between the social networking system 730 and one or more user devices 710. The messages can be instant messages, queued messages (e.g., email), text and SMS messages, or any other suitable messaging format.

The API request server 734 allows one or more external systems 720 and user devices 710 to call access information from the social networking system 730 by calling one or more API functions. The API request server 734 may also allow external systems 720 to send information to the social networking system 730 by calling APIs. The external system 720, in one embodiment, sends an API request to the social networking system 730 via the network 750, and the API request server 734 receives the API request. The API request server 734 processes the request by calling an API associated with the API request to generate an appropriate response, which the API request server 734 communicates to the external system 720 via the network 750. For example, responsive to an API request, the API request server 734 collects data associated with a user, such as the user's connections that have logged into the external system 720, and communicates the collected data to the external system 720. In another embodiment, the user device 710 communicates with the social networking system 730 via APIs in the same manner as external systems 720.

The action logger 740 is capable of receiving communications from the web server 732 about user actions on and/or off the social networking system 730. The action logger 740 populates the activity log 742 with information about user actions, enabling the social networking system 730 to discover various actions taken by its users within the social networking system 730 and outside of the social networking system 730. Any action that a particular user takes with respect to another node on the social networking system 730 may be associated with each user's account, through information maintained in the activity log 742 or in a similar database or other data repository. Examples of actions taken by a user within the social networking system 730 that are identified and stored may include, for example, adding a connection to another user, sending a message to another user, reading a message from another user, viewing content associated with another user, attending an event posted by another user, posting an image, attempting to post an image, or other actions interacting with another user or another object. When a user takes an action within the social networking system 730, the action is recorded in the activity log 742. In one embodiment, the social networking system 730 maintains the activity log 742 as a database of entries. When an action is taken within the social networking system 730, an entry for the action is added to the activity log 742. The activity log 742 may be referred to as an action log.

Additionally, user actions may be associated with concepts and actions that occur within an entity outside of the social networking system 730, such as an external system 720 that is separate from the social networking system 730. For example, the action logger 740 may receive data describing a user's interaction with an external system 720 from the web server 732. In this example, the external system 720 reports a user's interaction according to structured actions and objects in the social graph.

Other examples of actions where a user interacts with an external system 720 include a user expressing an interest in an external system 720 or another entity, a user posting a comment to the social networking system 730 that discusses an external system 720 or a web page 722a within the external system 720, a user posting to the social networking system 730 a Uniform Resource Locator (URL) or other identifier associated with an external system 720, a user attending an event associated with an external system 720, or any other action by a user that is related to an external system 720. Thus, the activity log 742 may include actions describing interactions between a user of the social networking system 730 and an external system 720 that is separate from the social networking system 730.

The authorization server 744 enforces one or more privacy settings of the users of the social networking system 730. A privacy setting of a user determines how particular information associated with a user can be shared. The privacy setting comprises the specification of particular information associated with a user and the specification of the entity or entities with whom the information can be shared. Examples of entities with which information can be shared may include other users, applications, external systems 720, or any entity that can potentially access the information. The information that can be shared by a user comprises user account information, such as profile photos, phone numbers associated with the user, user's connections, actions taken by the user such as adding a connection, changing user profile information, and the like.

The privacy setting specification may be provided at different levels of granularity. For example, the privacy setting may identify specific information to be shared with other users; the privacy setting identifies a work phone number or a specific set of related information, such as, personal information including profile photo, home phone number, and status. Alternatively, the privacy setting may apply to all the information associated with the user. The specification of the set of entities that can access particular information can also be specified at various levels of granularity. Various sets of entities with which information can be shared may include, for example, all friends of the user, all friends of friends, all applications, or all external systems 720. One embodiment allows the specification of the set of entities to comprise an enumeration of entities. For example, the user may provide a list of external systems 720 that are allowed to access certain information. Another embodiment allows the specification to comprise a set of entities along with exceptions that are not allowed to access the information. For example, a user may allow all external systems 720 to access the user's work information, but specify a list of external systems 720 that are not allowed to access the work information. Certain embodiments call the list of exceptions that are not allowed to access certain information a "block list". External systems 720 belonging to a block list specified by a user are blocked from accessing the information specified in the privacy setting. Various combinations of granularity of specification of information, and granularity of specification of entities, with which information is shared are possible. For example, all personal information may be shared with friends whereas all work information may be shared with friends of friends.

The authorization server 744 contains logic to determine if certain information associated with a user can be accessed by a user's friends, external systems 720, and/or other applications and entities. The external system 720 may need authorization from the authorization server 744 to access the user's more private and sensitive information, such as the user's work phone number. Based on the user's privacy settings, the authorization server 744 determines if another user, the external system 720, an application, or another entity is allowed to access information associated with the user, including information about actions taken by the user.

In some embodiments, the social networking system 730 can include a device-tailored image module 746. The device-tailored image module 746 can, for example, be implemented as the device-tailored image module 102 of FIG. 1. As discussed previously, it should be appreciated that there can be many variations or other possibilities. For example, in some instances, the device-tailored image module (or at least a portion thereof) can be included or implemented in the user device 710. Other features of the device-tailored image module 746 are discussed herein in connection with the device-tailored image module 102.

Hardware Implementation

Figure 8:
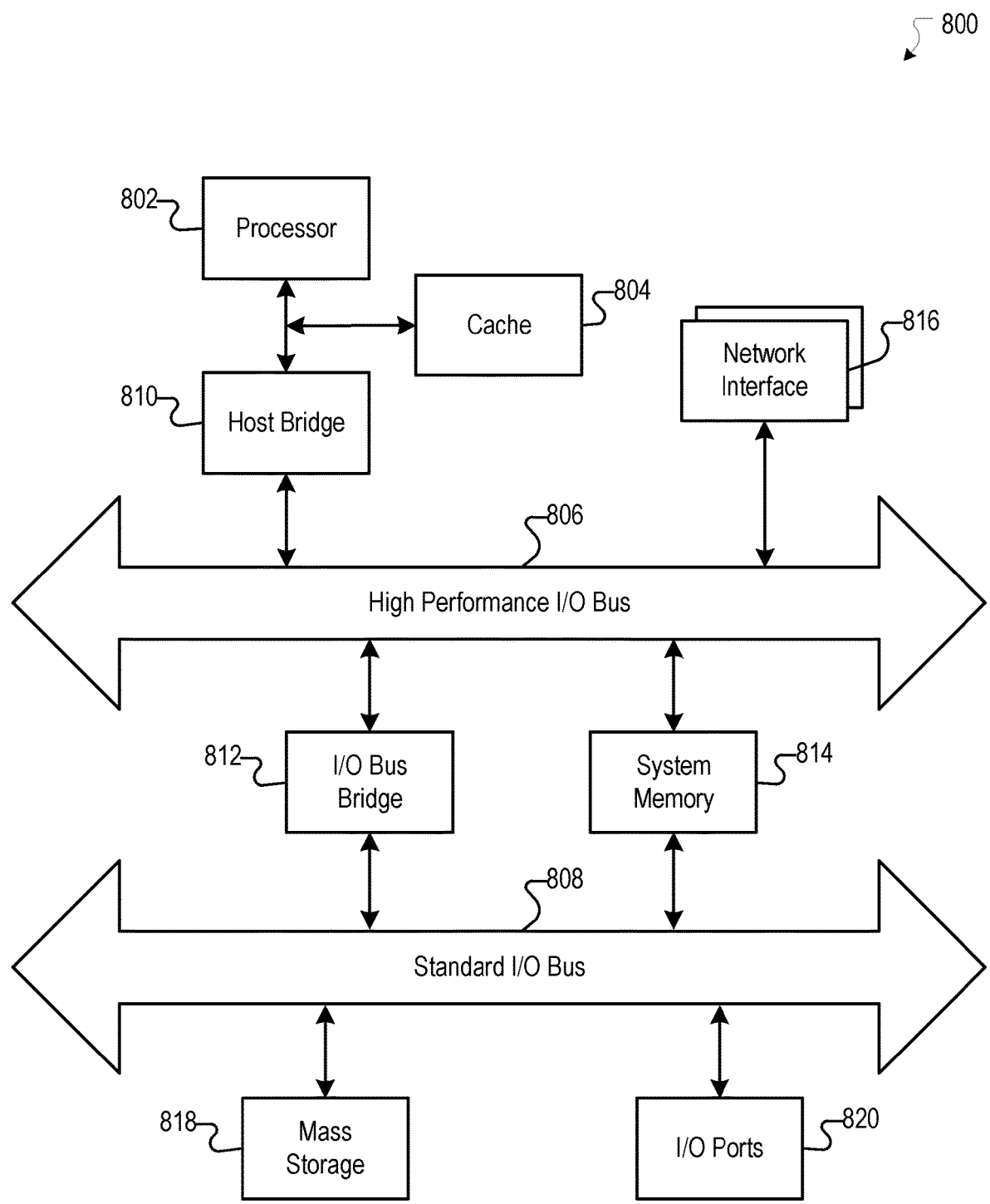
FIG. 8 illustrates an example of a computer system or computing device that can be utilized in various scenarios, according to an embodiment of the present disclosure.

The foregoing processes and features can be implemented by a wide variety of machine and computer system architectures and in a wide variety of network and computing environments. FIG. 8 illustrates an example of a computer system 800 that may be used to implement one or more of the embodiments described herein in accordance with an embodiment of the invention. The computer system 800 includes sets of instructions for causing the computer system 800 to perform the processes and features discussed herein. The computer system 800 may be connected (e.g., networked) to other machines. In a networked deployment, the computer system 800 may operate in the capacity of a server machine or a client machine in a client-server network environment, or as a peer machine in a peer-to-peer (or distributed) network environment. In an embodiment of the invention, the computer system 800 may be the social networking system 730, the user device 710, and the external system 820, or a component thereof. In an embodiment of the invention, the computer system 800 may be one server among many that constitutes all or part of the social networking system 730.

The computer system 800 includes a processor 802, a cache 804, and one or more executable modules and drivers, stored on a computer-readable medium, directed to the processes and features described herein. Additionally, the computer system 800 includes a high performance input/output (I/O) bus 806 and a standard I/O bus 808. A host bridge 810 couples processor 802 to high performance I/O bus 806, whereas I/O bus bridge 812 couples the two buses 806 and 808 to each other. A system memory 814 and one or more network interfaces 816 couple to high performance I/O bus 806. The computer system 800 may further include video memory and a display device coupled to the video memory (not shown). Mass storage 818 and I/O ports 820 couple to the standard I/O bus 808. The computer system 800 may optionally include a keyboard and pointing device, a display device, or other input/output devices (not shown) coupled to the standard I/O bus 808. Collectively, these elements are intended to represent a broad category of computer hardware systems, including but not limited to computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

An operating system manages and controls the operation of the computer system 800, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Computer Inc. of Cupertino, Calif., UNIX operating systems, Microsoft® Windows® operating systems, BSD operating systems, and the like. Other implementations are possible.

The elements of the computer system 800 are described in greater detail below. In particular, the network interface 816 provides communication between the computer system 800 and any of a wide range of networks, such as an Ethernet (e.g., IEEE 802.3) network, a backplane, etc. The mass storage 818 provides permanent storage for the data and programming instructions to perform the above-described processes and features implemented by the respective computing systems identified above, whereas the system memory 814 (e.g., DRAM) provides temporary storage for the data and programming instructions when executed by the processor 802. The I/O ports 820 may be one or more serial and/or parallel communication ports that provide communication between additional peripheral devices, which may be coupled to the computer system 800.

The computer system 800 may include a variety of system architectures, and various components of the computer system 800 may be rearranged. For example, the cache 804 may be on-chip with processor 802. Alternatively, the cache 804 and the processor 802 may be packed together as a "processor module", with processor 802 being referred to as the "processor core". Furthermore, certain embodiments of the invention may neither require nor include all of the above components. For example, peripheral devices coupled to the standard I/O bus 808 may couple to the high performance I/O bus 806. In addition, in some embodiments, only a single bus may exist, with the components of the computer system 800 being coupled to the single bus. Moreover, the computer system 800 may include additional components, such as additional processors, storage devices, or memories.

In general, the processes and features described herein may be implemented as part of an operating system or a specific application, component, program, object, module, or series of instructions referred to as "programs". For example, one or more programs may be used to execute specific processes described herein. The programs typically comprise one or more instructions in various memory and storage devices in the computer system 800 that, when read and executed by one or more processors, cause the computer system 800 to perform operations to execute the processes and features described herein. The processes and features described herein may be implemented in software, firmware, hardware (e.g., an application specific integrated circuit), or any combination thereof.

In one implementation, the processes and features described herein are implemented as a series of executable modules run by the computer system 800, individually or collectively in a distributed computing environment. The foregoing modules may be realized by hardware, executable modules stored on a computer-readable medium (or machine-readable medium), or a combination of both. For example, the modules may comprise a plurality or series of instructions to be executed by a processor in a hardware system, such as the processor 802. Initially, the series of instructions may be stored on a storage device, such as the mass storage 818. However, the series of instructions can be stored on any suitable computer readable storage medium. Furthermore, the series of instructions need not be stored locally, and could be received from a remote storage device, such as a server on a network, via the network interface 816. The instructions are copied from the storage device, such as the mass storage 818, into the system memory 814 and then accessed and executed by the processor 802. In various implementations, a module or modules can be executed by a processor or multiple processors in one or multiple locations, such as multiple servers in a parallel processing environment.

Examples of computer-readable media include, but are not limited to, recordable type media such as volatile and non-volatile memory devices; solid state memories; floppy and other removable disks; hard disk drives; magnetic media; optical disks (e.g., Compact Disk Read-Only Memory (CD ROMS), Digital Versatile Disks (DVDs)); other similar non-transitory (or transitory), tangible (or non-tangible) storage medium; or any type of medium suitable for storing, encoding, or carrying a series of instructions for execution by the computer system 800 to perform any one or more of the processes and features described herein.

For purposes of explanation, numerous specific details are set forth in order to provide a thorough understanding of the description. It will be apparent, however, to one skilled in the art that embodiments of the disclosure can be practiced without these specific details. In some instances, modules, structures, processes, features, and devices are shown in block diagram form in order to avoid obscuring the description. In other instances, functional block diagrams and flow diagrams are shown to represent data and logic flows. The components of block diagrams and flow diagrams (e.g., modules, blocks, structures, devices, features, etc.) may be variously combined, separated, removed, reordered, and replaced in a manner other than as expressly described and depicted herein.

Reference in this specification to "one embodiment", "an embodiment", "other embodiments", "one series of embodiments", "some embodiments", "various embodiments", or the like means that a particular feature, design, structure, or characteristic described in connection with the embodiment is included in at least one embodiment of the disclosure. The appearances of, for example, the phrase in one embodiment" or "in an embodiment" in various places in the specification are not necessarily all referring to the same embodiment, nor are separate or alternative embodiments mutually exclusive of other embodiments. Moreover, whether or not there is express reference to an "embodiment" or the like, various features are described, which may be variously combined and included in some embodiments, but also variously omitted in other embodiments. Similarly, various features are described that may be preferences or requirements for some embodiments, but not other embodiments. Furthermore, reference in this specification to "based on" can mean "based, at least in part, on", "based on at least a portion/part of", "at least a portion/part of which is based on", and/or any combination thereof.

The language used herein has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method comprising:
   storing, by a computing system, a set of image portions, wherein an entirety of the set of image portions collectively forms a single image at a specified resolution, wherein a first image portion of the set of image portions provides general details of the single image, and
   wherein a second image portion of the set of image portions provides further details of the single image;
   acquiring, by the computing system, a request from a client device for the image,
   wherein the request includes information about one or more properties associated with the client device, wherein the one or more properties indicate at least a location at which the client device is used;
   selecting, by the computing system, a subset of image portions out of the set of image portions based on the location, wherein the subset of image portions includes at least a first quantity of image portions when the location corresponds to a first region with a level of network capability above a specified threshold, and a second quantity of image portions less than the first quantity when the location corresponds to a second region with a level of network capability below the specified threshold; and
   transmitting, by the computing system, the subset of image portions to the client device in response to the request.

2. The computer-implemented method of claim 1, wherein selecting the subset of image portions out of the set of image portions based on the one or more properties associated with the client device further comprises:
   determining, based on the one or more properties, at least one of a client resolution or a client dimension of a display element of the client device;
   determining a quantity of image portions forming a version of the image that is capable of being rendered to match, within an allowable deviation, the at least one of the client resolution or the client dimension of the display element; and
   including the quantity of image portions in the subset of image portions.

3. The computer-implemented method of claim 2, wherein the version of the image maintains at least a specified threshold level of visually perceived detail, and wherein the specified threshold level of visually perceived detail is based on at least some of the one or more properties associated with the client device.

4. The computer-implemented method of claim 2, further comprising:
   causing the version of the image to be displayed via the client device at the client resolution.

5. The computer-implemented method of claim 1, wherein the set of image portions that collectively forms the single image at the specified resolution is stored via a cache associated with a content delivery network.

6. The computer-implemented method of claim 5, wherein the cache excludes one or more different versions of the image at one or more different resolutions other than the specified resolution.

7. The computer-implemented method of claim 1, wherein the set of image portions includes a set of one or more image data parts.

8. The computer-implemented method of claim 7, wherein the image includes a Joint Photographic Experts Group (JPEG) image, and wherein the set of the one or more image data parts includes a set of one or more progressive JPEG scans.

9. A system comprising:
   at least one processor; and
   a memory storing instructions that, when executed by the at least one processor, cause the system to perform:
      storing a set of image portions, wherein an entirety of the set of image portions collectively forms a single image at a specified resolution,
         wherein a first image portion of the set of image portions provides general details of the single image, and wherein a second image portion of the set of image portions provides further details of the single image;

acquiring a request from a client device for the image, wherein the request includes information about one or more properties associated with the client device, wherein the one or more properties indicate at least a location at which the client device is used;

selecting a subset of image portions out of the set of image portions based on the location, wherein the subset of image portions includes
at least a first quantity of image portions when the location corresponds to a first region with a level of network capability above a specified threshold, and
a second quantity of image portions less than the first quantity when the location corresponds to a second region with a level of network capability below the specified threshold; and transmitting the subset of image portions to the client device in response to the request.

10. The system of claim 9, wherein selecting the subset of image portions out of the set of image portions based on the one or more properties associated with the client device further comprises:
determining, based on the one or more properties, at least one of a client resolution or a client dimension of a display element of the client device;
determining a quantity of image portions forming a version of the image that is capable of being rendered to match, within an allowable deviation, the at least one of the client resolution or the client dimension of the display element; and
including the quantity of image portions in the subset of image portions.

11. The system of claim 9, wherein the set of image portions includes a set of one or more image data parts.

12. The system of claim 11, wherein the image includes a Joint Photographic Experts Group (JPEG) image, and wherein the set of the one or more image data parts includes a set of one or more progressive JPEG scans.

13. The system of claim 9, wherein the set of image portions that collectively forms the single image at the specified resolution is stored via a cache associated with a content delivery network.

14. The system of claim 13, wherein the cache excludes one or more different versions of the image at one or more different resolutions other than the specified resolution.

15. A non-transitory computer-readable storage medium including instructions that, when executed by at least one processor of a computing system, cause the computing system to perform a method comprising:
storing a set of image portions, wherein an entirety of the set of image portions collectively forms a single image at a specified resolution,
wherein a first image portion of the set of image portions provides general details of the single image, and
wherein a second image portion of the set of image portions provides further details of the single image;

acquiring a request from a client device for the image, wherein the request includes information about one or more properties associated with the client device, wherein the one or more properties indicate at least a location at which the client device is used;

selecting a subset of image portions out of the set of image portions based on the location, wherein the subset of image portions includes
at least a first quantity of image portions when the location corresponds to a first region with a level of network capability above a specified threshold, and
a second quantity of image portions less than the first quantity when the location corresponds to a second region with a level of network capability below the specified threshold; and transmitting the subset of image portions to the client device in response to the request.

16. The non-transitory computer-readable storage medium of claim 15, wherein selecting the subset of image portions out of the set of image portions based on the one or more properties associated with the client device further comprises:
determining, based on the one or more properties, at least one of a client resolution or the client dimension of a display element of the client device;
determining a quantity of image portions forming a version of the image that is capable of being rendered to match, within an allowable deviation, the at least one of the client resolution or the client dimension of the display element; and
including the quantity of image portions in the subset of image portions.

17. The non-transitory computer-readable storage medium of claim 15, wherein the set of image portions includes a set of one or more image data parts.

18. The non-transitory computer-readable storage medium of claim 17, wherein the image includes a Joint Photographic Experts Group (JPEG) image, and wherein the set of the one or more image data parts includes a set of one or more progressive JPEG scans.

19. The non-transitory computer-readable storage medium of claim 15, wherein the set of image portions that collectively forms the single image at the specified resolution is stored via a cache associated with a content delivery network.

20. The non-transitory computer-readable storage medium of claim 19, wherein the cache excludes one or more different versions of the image at one or more different resolutions other than the specified resolution.

* * * * *